United States Patent
Matsui et al.

(10) Patent No.: US 6,478,254 B2
(45) Date of Patent: Nov. 12, 2002

(54) SKIN/BULKHEAD STRUCTURE

(75) Inventors: Nobuo Matsui, Saitama-ken (JP); Daiya Yamashita, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/842,159

(22) Filed: Apr. 26, 2001

(65) Prior Publication Data

US 2001/0035118 A1 Nov. 1, 2001

(30) Foreign Application Priority Data

May 1, 2000 (JP) ........................ 2000-132682

(51) Int. Cl.$^7$ ............................... B64C 1/10
(52) U.S. Cl. ................................ 244/119
(58) Field of Search ........................ 244/119, 117 R, 244/123; 114/78, 312, 341; 446/34

(56) References Cited

U.S. PATENT DOCUMENTS

| | | | |
|---|---|---|---|
| 2,405,918 A | * | 8/1946 | Watter ........................ 244/119 |
| 5,062,589 A | * | 11/1991 | Roth et al. ................ 244/117 R |
| 5,899,412 A | * | 5/1999 | Dilorio et al. ................ 244/119 |
| 5,934,616 A | * | 8/1999 | Reimers et al. .............. 244/119 |
| 6,114,012 A | * | 9/2000 | Amoaka et al. ............. 428/182 |
| 6,213,426 B1 | * | 4/2001 | Weber et al. ............ 244/117 R |

FOREIGN PATENT DOCUMENTS

GB 2134059 A * 1/1984 ............... 244/17.11

* cited by examiner

Primary Examiner—Peter M. Poon
Assistant Examiner—Timothy Collins
(74) Attorney, Agent, or Firm—Sughrue Mion, PLLC

(57) ABSTRACT

A skin/bulkhead structure comprising a barrel-shaped skin and a pressure bulkhead composed of a stiffening member and a bulkhead skin, wherein an end of the stiffening member is mechanically connected to an opening of the barrel-shaped skin through a first connecting member and marginal portion of the bulkhead skin is adhesive-connected to the opening through a second connecting member, the barrel-shaped skin, the stiffening member, the bulkhead skin, the first connecting member and the second connecting member being each made of a fiber-reinforced composite.

6 Claims, 3 Drawing Sheets

SKIN/BULKHEAD STRUCTURE

BACKGROUND OF THE INVENTION

The present invention relates to a skin/bulkhead structure comprising a barrel-shaped skin made of a fiber-reinforced composite and a pressure bulkhead connected to an opening of the barrel-shaped skin.

Pressure bulkheads, which are installed in front and back of a pressurized cabin of aircrafts, etc., are classified to spherical panels and flat panels. In large aircrafts, the spherical panels are often used as an aft pressure bulkhead. The spherical panels are generally composed of a stiffened spherical plate, and a pressure is applied thereto as membrane force. The spherical panels are advantageous in high structural efficiency and small weight penalty, however, it necessitates high production cost and useless, excessive spaces. On the other hand, in small aircrafts, the flat panels are desirably used as the pressure bulkhead from the viewpoint of space-saving. The flat panels are generally composed of a flat plate stiffened by thick beams, and they receive an applied pressure as bending moment. The flat panels have a remarkably simple composition and high space efficiency.

The pressure bulkhead is demanded to be connected to a barrel-shaped skin with high reliability. In a small aircraft body made of a fiber-reinforced composite, conventionally, the pressure bulkhead has been connected to the barrel-shaped skin by such a method that comprises the steps of: connecting marginal portion of the pressure bulkhead to the barrel-shaped skin by a rivet, adhesion, etc.; and providing complicated sealing to prevent the body from airleaking. However, this method has suffered disadvantages of increased production cost and heavy weight.

OBJECT AND SUMMARY OF THE INVENTION

An object of the present invention is to provide a light, reliable skin/bulkhead structure comprising a barrel-shaped skin and a pressure bulkhead, which is excellent in space efficiency and can be produced with reduced production cost.

As a result of intensive research in view of the above object, the inventor has found that a light, reliable skin/bulkhead structure comprising a barrel-shaped skin and a pressure bulkhead can be produced with excellent space efficiency and reduced production cost if the pressure bulkhead is connected to the barrel-shaped skin by a combination of mechanical connection and adhesive connection. The present invention has been accomplished by the finding.

Thus, a skin/bulkhead structure of the present invention comprises a barrel-shaped skin and a pressure bulkhead composed of a stiffening member and a bulkhead skin, wherein an end of the stiffening member is mechanically connected to an opening of the barrel-shaped skin through a first connecting member and marginal portion of the bulkhead skin is adhesive-connected to the opening through a second connecting member, the barrel-shaped skin, the stiffening member, the bulkhead skin, the first connecting member and the second connecting member being each made of a fiber-reinforced composite.

According to the skin/bulkhead structure of the present invention, it is preferable that the opening of the barrel-shaped skin has edge portion expanded over the pressure bulkhead, and the end of the stiffening member is mechanically connected to the edge portion. The bulkhead skin is preferably a flat plate in shape, and the stiffening member preferably has an I-shaped cross section. Further, the second connecting member is preferably a ring in shape, and a cross section thereof is preferably in L-shape.

DETAILED DESCRIPTION OF THE PREFERRED EMBODIMENTS

A skin/bulkhead structure of the present invention will be explained in detail below with reference to FIGS. 1 to 3 without intention of restricting the scope of the present invention defined by the claims attached hereto.

Figure 1:
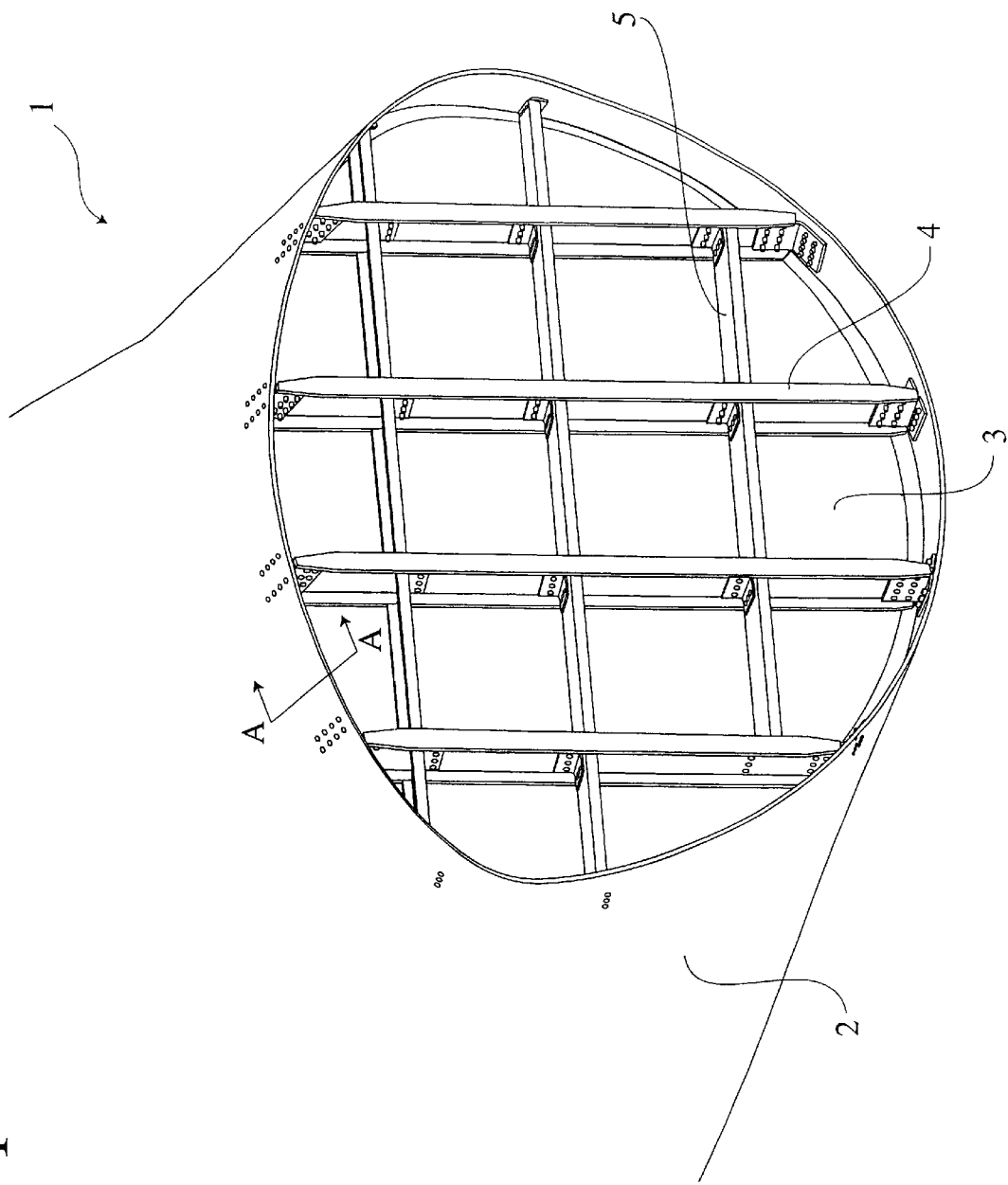
FIG. 1 is a partial perspective view showing an embodiment of a skin/bulkhead structure according to the present invention.
Figure 2:
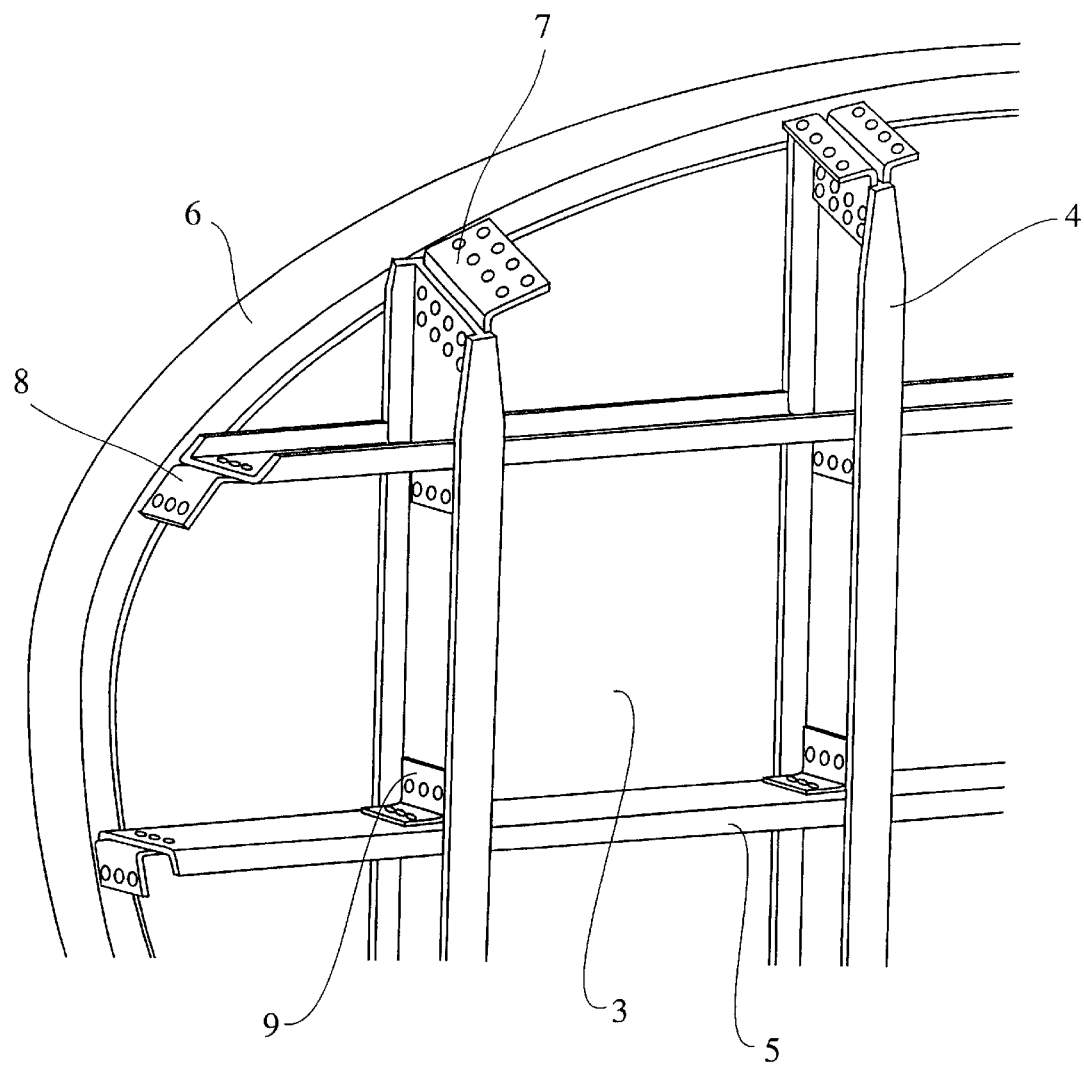
FIG. 2 is an enlarged, partial perspective view showing the skin/bulkhead structure of FIG. 1.
Figure 3:
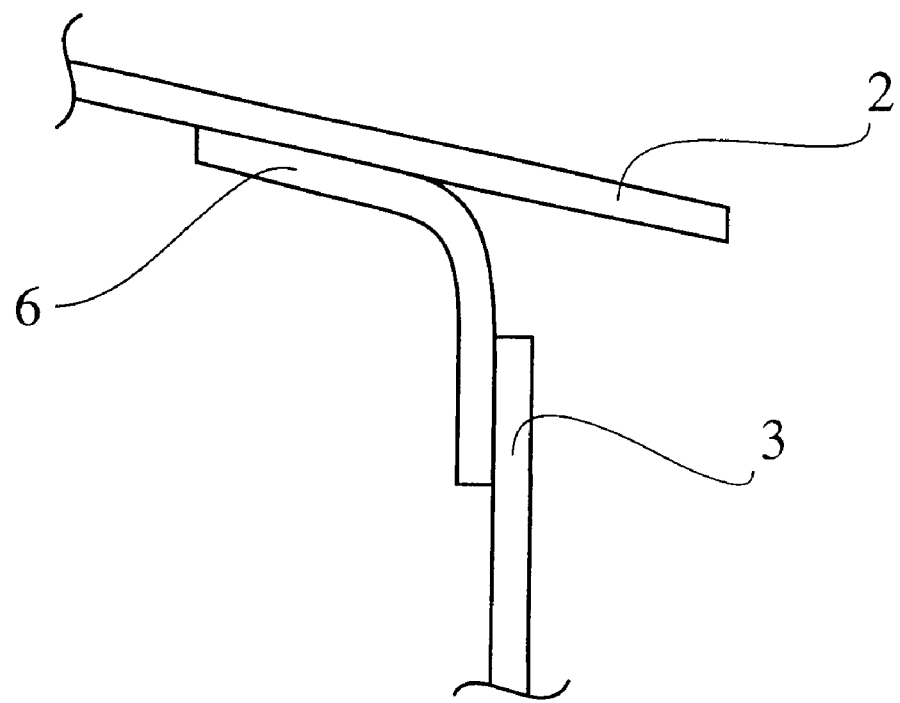
FIG. 3 is a partial cross sectional view showing the skin/bulkhead structure of FIG. 1 taken along the line A—A.

FIG. 1 partially shows an embodiment of a skin/bulkhead structure according to the present invention, and FIG. 2 is an enlarged, partial perspective view showing the skin/bulkhead structure of FIG. 1 where a barrel-shaped skin 2 is not shown, and FIG. 3 is a partial cross sectional view showing the same taken along the line A—A. As shown in FIG. 1, the skin/bulkhead structure 1 comprises a barrel-shaped skin 2 and a pressure bulkhead connected to an opening thereof The pressure bulkhead shown in FIG. 1 is composed of stiffening members and a bulkhead skin 3. In this embodiment, main beams 4 and sub-beams 5 are used as the stiffening members. As shown in FIG. 2, ends of the main beams 4 and the sub-beams 5 are mechanically connected to the opening of the barrel-shaped skin 2 through main clips 7 and sub-clips 8 used as first connecting members. Marginal portion of the bulkhead skin 3 is adhesive-connected to the opening of the barrel-shaped skin 2 through a second connecting member 6. Intersections of the main beams 4 and the sub-beams 5 may be strengthened by angle joints 9, etc., if necessary.

The barrel-shaped skin, the stiffening member, the bulkhead skin, the first connecting member and the second connecting member used in the present invention are each made of a fiber-reinforced composite. In the present invention, the fiber-reinforced composite may be a reinforcing fiber such as a carbon fiber, a glass fiber, an aramid fiber, etc. impregnated with a thermosetting resin or a thermoplastic resin. The thermosetting resin may be an epoxy resin, a bismaleimide resin, a phenol resin, etc., and the thermoplastic resin may be PEEK, nylon 6, nylon 66, polyethylene terephthalate, etc. Preferred as the thermosetting resin is an epoxy resin, and preferred as the thermoplastic resin is nylon. Ratio of the resin to the reinforcing fiber in the fiber-reinforced composite may be appropriately controlled. The barrel-shaped skin, the stiffening member, the bulkhead skin, the first connecting member and the second connecting member are preferably made of the same fiber-reinforced composite, although they may be made of different composites.

Load applied to the pressure bulkhead reaches the barrel-shaped skin through the following two pathways: (1) the bulkhead skin the stiffening member the first connecting member the barrel-shaped skin; and (2) the bulkhead skin the second connecting member the barrel-shaped skin.

Most of the applied load reaches the barrel-shaped skin through the pathway (1). Therefore, to secure reliability of the skin/bulkhead structure, the end of the stiffening member has to be mechanically connected to the opening of the barrel-shaped skin through the first connecting member. The first connecting member is not particularly limited, and may be a fastener of fiber reinforced plastic ("FRP"), a bolt of a stainless steel or a metal, etc. The first connecting member is preferably made of titanium, which is light in weight and excellent in corrosion resistance.

On the other hand, only a little of the applied load reaches the barrel-shaped skin through the pathway (2), whereby the marginal portion of the bulkhead skin may be just adhesive-connected to the opening of the barrel-shaped skin through the second connecting member, to obtain sufficient strength. In the present invention, the bulkhead skin and the barrel-shaped skin are assembled by the adhesive-connection without complicated sealing, thereby reducing weight and production cost of the skin/bulkhead structure. In the adhesive-connection, an adhesive such as an epoxy resin is preferably used. A plurality of the adhesives may be used in combination. The adhesive-connection is preferably carried out under a pressure of 0.1 to 2 $kg/cm^2$.

Thickness of the barrel-shaped skin is not particularly limited and it may be selected depending on use of the skin/bulkhead structure. Specific shape of the barrel-shaped skin may be a cylinder shape, an elliptic cylinder shape, a pipe shape having a corner portion, etc., it being also not particularly limited.

The pressure bulkhead is composed of the bulkhead skin and the stiffening member arranged thereon. The bulkhead skin is preferably a flat plate in shape from the viewpoint of space efficiency. The bulkhead skin preferably has thickness of 0.8 to 2.3 mm in the case of using it for small aircrafts. The stiffening member may be fixed to the bulkhead skin by adhesion, a rivet, etc. In particular, the stiffening member is preferably fixed to the bulkhead skin by adhesion. Though the stiffening members are generally arranged in lattice pattern on the bulkhead skin, positional relationships therebetween and number thereof may be properly changed. It is preferable that the opening of the barrel-shaped skin has edge portion expanded over the pressure bulkhead to be not pressurized, and the end of the stiffening member is mechanically connected to the edge portion.

According to the skin/bulkhead structure 1 shown in FIGS. 1 and 2, the main beams 4 and the sub-beams 5 correspond to the above-mentioned stiffening member. The main beams 4 have an I-shaped cross section, and the sub-beams 5 separated by the main beams 4 have a C-shaped cross section. The stiffening member used in the present invention may have a cross section of C-shape, I-shape, J-shape, T-shape, etc. The stiffening member preferably has an I-shaped cross section to be scarcely twisted or toppled.

The second connecting member used in the present invention is preferably a ring in shape. Further, a cross section thereof is preferably in L-shape as the second connecting member 6 shown in FIGS. 2 and 3.

In the skin/bulkhead structure 1 shown in FIG. 2, the main clips 7 and the sub-clips 8 are used as the first connecting member. The first connecting member having an L-shaped cross section such as shown in FIGS. 1 and 2 is preferably used in this invention to mechanically connect the stiffening member to the barrel-shaped skin with ease.

While the invention has been described with reference to FIGS. 1 to 3, it will be apparent to one skilled in the art that various changes and modifications can be made therein without departing from the spirit and scope thereof.

As described in detail above, a skin/bulkhead structure of the present invention comprises a barrel-shaped skin made of a fiber-reinforced composite and a pressure bulkhead connected to an opening thereof. The skin/bulkhead structure is reliable, light in weight and excellent in space efficiency, and can be produced with reduced production cost. The skin/bulkhead structure can be preferably used for aircraft bodies.

What is claimed is:

1. A skin/bulkhead structure comprising:

a barrel-shaped skin having an opening; and a pressure bulkhead composed of (1) a stiffening member, and (2) a bulkhead skin, wherein an end of said stiffening member is mechanically fastened to said barrel-shaped skin through a first connecting member, wherein said bulkhead skin is adhesive-connected via an adhesive material to said barrel-shaped skin through a second connecting member, and wherein said barrel-shaped skin, said stiffening member, said bulkhead skin, said first connecting member, and said second connecting member are made of a fiber-reinforced composite.

2. The skin/bulkhead structure according to claim 1, wherein said opening of said barrel shaped skin is defined by an edge portion of said barrel-shaped skin that extends over said pressure bulkhead, and said end of said stiffening member is mechanically connected to said edge portion.

3. The skin/bulkhead structure according to claim 1, wherein said bulkhead skin is a flat plate.

4. The skin/bulkhead structure according to claim 1, wherein said stiffening member has an I-shaped cross section.

5. The skin/bulkhead structure according to claim 1, wherein said second connecting member has a ring shape.

6. The skin/bulkhead structure according to claim 1, wherein said second connecting member has an L-shaped cross section.

* * * * *